Figure 1:
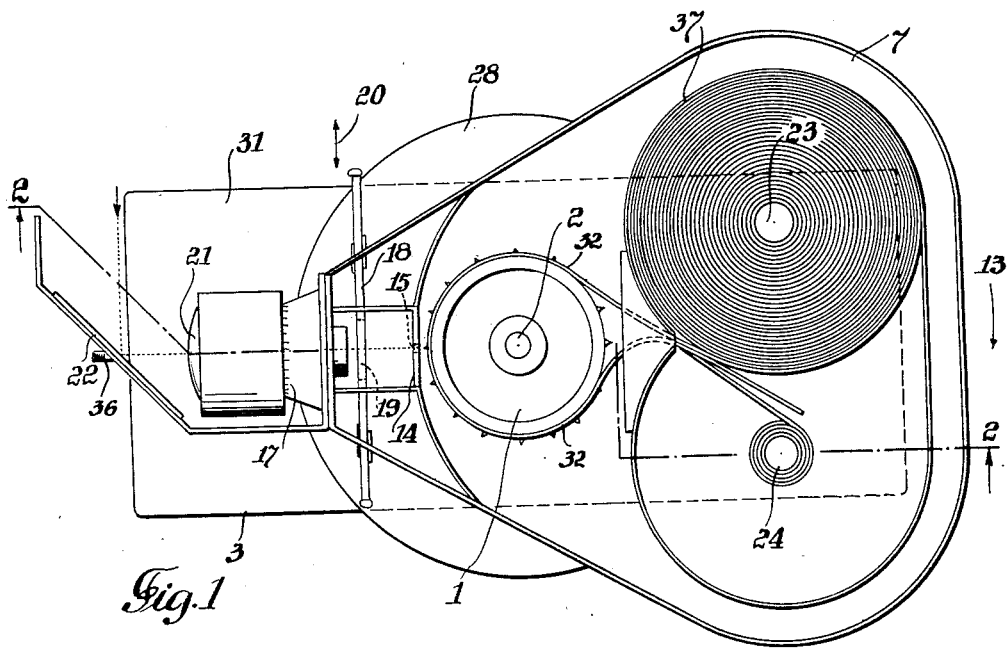

May 30, 1944.　　　　F. G. BACK　　　　2,349,931

PANORAMIC CAMERA

Filed May 7, 1942　　　　2 Sheets-Sheet 1

INVENTOR:
Franz G. Back

May 30, 1944.　　　　F. G. BACK　　　　2,349,931
PANORAMIC CAMERA
Filed May 7, 1942　　　　2 Sheets-Sheet 2

INVENTOR:
Franz G. Back

Patented May 30, 1944

2,349,931

UNITED STATES PATENT OFFICE 2,349,931

PANORAMIC CAMERA

Franz G. Back, New York, N. Y., assignor of one-half to Robert D. Eshbaugh and one-half to Gastro-Photor Laboratories, both of New York, N. Y.

Application May 7, 1942, Serial No. 442,012

14 Claims. (Cl. 95—17)

My present invention relates to improvements in photographic cameras, more particularly of that class known as panoramic cameras wherein an extended view may be photographed by a single operation.

An object of my present invention is to provide a panoramic camera of particularly simple design.

A further object of my invention consists of a panoramic camera in which the panoramic picture is made on a light-sensitive material stationarily supported during exposure.

Still a further object of my present invention consists of a panoramic camera of compact construction, making employment of a great number of guiding rolls and the like unnecessary.

Still another object of my present invention consists of a panoramic camera in which not only a film of standard type but also standardized film supporting and transporting members may be used.

With these above objects in view, my present invention mainly consists of a panoramic camera comprising in combination a stationary cylindrical member adapted to support the film during exposure, a camera casing enclosing said stationary cylindrical member and the film to be exposed and being arranged rotatably about the axis of said stationary cylindrical member, and an optical picture taking system arranged in a wall of said rotatable casing in such a manner as to form during rotation of said casing the required panoramic picture on that portion of the film which is stationarily supported by said cylindrical member within said rotatable casing.

In a preferred embodiment of my invention a film sprocket of the usual type is used as stationary cylindrical member; furthermore, the optical picture taking system comprises an objective lens of usual design combined with an adjustable diaphragm of the type commonly used in photographic cameras.

It should be stressed that the focal length of the lens system has to be equal to the radius of the stationary film sprocket supporting the unexposed film during exposure. Furthermore, it is of importance that the objective lens be so arranged that the distance between its optical center and the surface of the stationary film sprocket be equal to the focal length of this lens, i. e. equal to the radius of the film sprocket. By this arrangement, the length of film exposed during one complete revolution of the camera is equivalent to the circumference of a circle, the radius of which is equivalent to the focal length of the objective lens. Thus always the proper length of film is carried into the line of light from the lens and also simplicity is secured and directness and positiveness of action obtained, with no chance for slipping of the film, as in other camera types used up to now.

Figure 2:
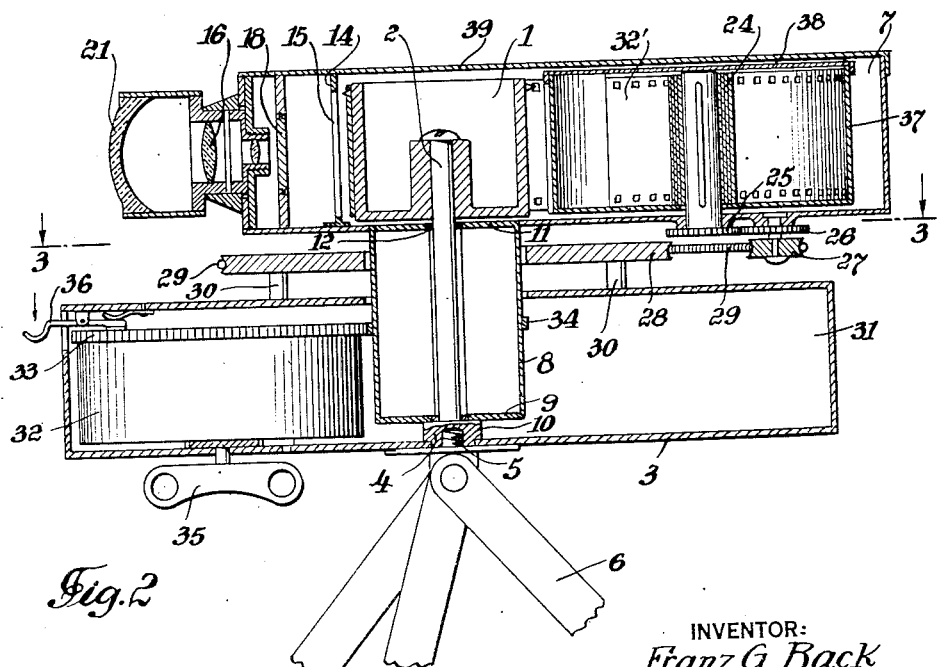
Figure 3:
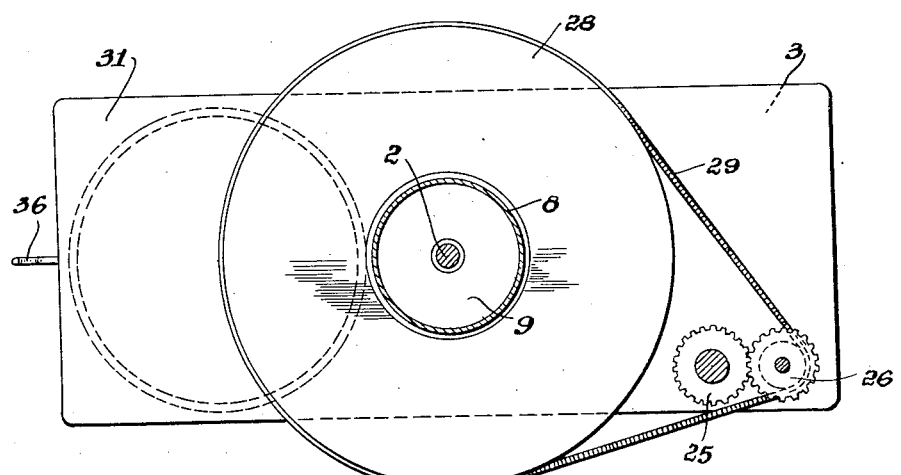

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference therein which form a part of this application in which:

Fig. 1 is a plan view of my new camera, without the covers of the camera casing and the film magazine;

Fig. 2 is a side elevational section of the camera shown in Fig. 1 along line 2—2 of this Figure; and Fig. 3 is a plan view in horizontal section of the camera shown in Figs. 1 and 2 along line 3—3 of Fig. 2.

Similar characters of reference refer to similar parts and portions throughout the several views of the drawings.

As indicated above, the camera comprises a stationary sprocket drum 1 secured by means of shaft 2 to the stationary base 3. On its lower face, this base 3 is provided with a bore 4 into which fits screw 5 of tripod 6. If required, the camera can be used without a tripod; then the base 3 can be placed on any flat support, as, for instance, a table or the like.

The stationary sprocket drum 1 is arranged within the rotatable camera casing 7, which latter is supported by the cylindrical member 8; this cylindrical member 8 is closed at its lower end by plate 9 and this latter plate rotatably supported by the annular shoulder 10 of the stationary shaft 2. An upper closing plate 11 provided with a circular hole 12, through which passes shaft 2, serves for holding the cylindrical member 8 and the rotatable camera casing 7 in correct relative position to the stationary sprocket drum 1. This arrangement enables rotation of camera casing 7 in direction of arrow 13 about the axis of drum 1.

Wall 14 of camera casing 7 is provided with a slit-shaped aperture 15 near the outer surface of the sprocket drum 1. During taking of the panoramic pictures, this slit 15 serves as exposure aperture limiting the light beam passing through lens 16. This aperture is arranged parallel to the axis of drum 1 near the surface of this drum and thus moves during rotation of camera casing 7 along the cylindrical surface of the stationary drum at a small distance from the same.

As shown in Figs. 1 and 2, the objective lens 16 is combined with an adjustable diaphragm 17; between diaphragm 17 and slit 14 a sliding member 18 provided with opening 19 is arranged. This sliding member is movable in direction of arrow 20 and serves for preventing the light passing through lens 16 to reach aperture 15 when this is not required.

As stated above, it is of eminent importance for correct operation of the camera that the focal length of the lens system used be equal to the radius of sprocket drum 1 and that this lens system be arranged in such a way that the distance between its optical center and the outer surface of drum 1 be also equal to the radius of this drum, i. e. equal to the focal length of this lens system.

As it is rather disadvantageous to use an objective lens of such short focal length, I prefer to combine an objective lens having a longer focal length with an additional concave lens 21 arranged in front of objective lens 16. By correctly adjusting the relative position of the concave lens 21 and the objective lens 16, it is possible to regulate the focal length of the optical lens system composed of both lenses in the required way, i. e. to provide an optical lens system having a focal length being equal to the length of the radius of sprocket drum 1.

It will be clear for everybody skilled in this art that it is necessary to reverse the picture which has to be taken before it reaches the objective lens 16. This is done by a reflecting member, e. g. a mirror 22, arranged in front of lens 16 at an angle of 45 degrees to the optical axis of this lens and parallel to the axis of drum 1. Thus the light rays coming from the object to be photographed are reversed twice, namely, first by mirror 22 and then by lens 16, so that they reach the light-sensitive film after two reversals, i. e. practically without any reversal, in the manner required for taking panoramic pictures.

Besides the stationary sprocket drum 1, a supply spool 23 and a winding-up spool 24 are arranged in camera casing 7. The supply spool 23 is freely rotatable, while the winding-up spool 24 is driven by means of pinions 25 and 26, pulleys 27 and 28, and the helical transmission spring 29. Pulley 28 is secured by means of brackets 30 to the stationary casing 31. Thus, during operation of the camera, pulley 28 remains stationary, and pulley 27 rotates simultaneously about the axis of pulley 28 and about its own axis. The rotation of pulley 27 causes pinions 26 and 25 to rotate; rotation of the latter pinion results in rotation of spool 24, and winding-up of the film 32 after the same is leaving the stationary sprocket drum 1.

Spring member 32, gear 33, and pinion 34 serve for rotating casing 7. Gear 33 is driven by spring 32 and is in mesh with pinion 34; this pinion is secured to cylindrical member 8 which is permanently attached to and is supporting casing 7. Spring 32 may be wound up by means of winding member 35; this winding member may be arranged detachably in order to enable placing of the base plate 3 of casing 31 during photographing onto a flat support, if required. The braking lever 36 serves for starting and stopping rotation of camera casing 7 by influencing the rotating movement of gear 33.

In order to enable easy exchange of the film, both film spools 23 and 24 are arranged within film magazine 37; this film magazine is exchangeable in the usual manner. The film magazine is equipped with a separate magazine cover 38 and can be closed independently from camera casing 7; cover 39 serves for closing the camera casing before starting with taking pictures.

The camera operates as follows:

First, a film strip of conventional type is inserted into the magazine, as shown in Fig. 1; this magazine then is inserted into camera casing 7 and a film loop formed about the stationary film drum 1.

Then, spring 55 is wound up and the rotating mechanism released by means of lever 36. This results in rotation of the entire film magazine in direction of arrow 13. Rotation of the camera casing causes additional rotation of film spool 24 about its axis. This latter rotation results in winding-up of film 32.

During rotation of the camera casing, the film coming from the supply spool 23 contacts the stationary sprocket drum 1 and stays in contact with the same until it is wound up on spool 24 by rotation of the latter. As clearly shown in the drawings, the film is exposed while it is in contact with the stationary sprocket drum 1, so the film portion which is exposed is not moving during exposure. Due to the construction of the objective lens and the relative position of this lens and drum 1, this stationary film portion is always in the focal plane of the lens during exposure, thereby ensuring sharp and well defined pictures.

It will be understood that each of the elements described above, or two or more together, may also find a useful application in other types of panoramic cameras differing from the types described above. Thus, for instance, it is possible to entirely omit the supply and winding-up mechanism for the film and to provide only a cylindrical film strip arranged stationarily about film drum 1, or another cylindrical film supporting member. Such construction would be an extremely simple one, as not only would it be possible to omit all film winding means but also to rotate the camera casing by hand. This camera casing which would then enclose only this cylindrical film strip and the cylindrical member supporting the same would be extremely small and simple in construction. It is evident that with a camera of such type it would be possible to take only one panoramic picture of 360 degrees. This, however, is often sufficient. Moreover, it would take no difficulty to provide in combination with such a simplified panoramic camera automatic means for replacing the exposed cylindrical film strip by an unexposed one.

It should be stressed, however, that also such simplified cameras have to embody all characteristic features of my present invention, i. e. they have to be provided with a stationary cylindrical support for the film to be exposed, a casing enclosing this support, a slit-shaped aperture in this casing, and a lens system being built and arranged in the above explained manner.

While I have illustrated and described the invention as embodied in panoramic cameras, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalency of the following claims.

What I claim as new and desire to secure by Letters Patent is:

1. A panoramic camera comprising in combination a stationary base, a stationary sprocket drum supported by this base and adapted to carry the film during exposure, a camera casing enclosing said stationary sprocket drum and being rotatable about the axis of the same, a supply and a winding-up spool for the film arranged within said camera casing rotatably with the same means for rotating said winding up spool about its axis while the same is simultaneously rotated together with said casing about the axis of said stationary sprocket drum, and an optical picture-taking system arranged in a wall of said rotatable casing in such a manner as to form during rotation of said casing the required panoramic picture on that portion of the film which is stationarily supported by said cylindrical member within said rotatable casing.

2. A panoramic camera comprising in combination a stationary base, a stationary sprocket drum supported by this base and adapted to carry the film during exposure, a camera casing enclosing said stationary sprocket drum and being rotatable about the axis of the same, a supply and a winding-up spool for the film arranged within said camera casing rotatably with the same, means for rotating said winding-up spool about its axis while the same is simultaneously rotated together with the casing about the axis of said stationary sprocket drum, a slit-shaped aperture in a wall of said casing arranged parallel to the axis of said stationary sprocket drum, and an objective lens secured to said casing in front of said aperture, said slit-shaped aperture and said objective lens operating in such a manner as to form during their rotation the required panoramic picture on that portion of the film which is stationarily supported by said stationary film drum within said rotatable casing.

3. A panoramic camera comprising in combination a stationary base, a stationary sprocket drum supported by this base and adapted to carry the film during exposure, a camera casing enclosing said stationary sprocket drum and being rotatable about the axis of the same, a supply and a winding-up spool for the film arranged within said camera casing rotatably with the same, motion transmitting means connecting said stationary sprocket drum and said winding-up spool for rotating the latter about its axis while it simultaneously rotates together with the casing about the axis of said stationary sprocket drum, an optical picture-taking system including a slit-shaped aperture arranged in a wall of said casing parallel to the axis of said stationary cylindrical member, an objective lens secured to said casing in front of said aperture, and a reflecting member being secured to said casing in front of said objective lens parallel to the axis of said stationary cylindrical member and at an acute angle with the optical axis of said objective lens, said slit-shaped aperture, said objective lens and said reflecting member being arranged in such relative position to each other as to form during their rotation the required panoramic picture on that film portion which is stationarily supported by said stationary cylindrical member within said rotatable casing.

4. A panoramic camera comprising in combination a stationary base, a stationary sprocket drum supported by this base and adapted to carry the film during exposure, a camera casing enclosing said stationary sprocket drum and being rotatable about the axis of the same, a supply and a winding-up spool for the film arranged parallel to said sprocket drum in said camera casing rotatably together with the latter means for rotating said winding-up spool about its axis while the same is rotating with the casing about the axis of said stationary sprocket drum, a slit-shaped aperture in a wall of said casing arranged parallel to the axis of said stationary film drum, an objective lens secured to said casing in front of said aperture, and a reflecting member secured to said casing in front of said objective lens parallel to the axis of rotation of said casing and at an angle of 45 degrees with the optical axis of said objective lens, said slit-shaped aperture, said objective lens, and said reflecting member being arranged in such relative position to each other as to form during their rotation the required panoramic picture on that film portion which is stationarily supported by said stationary cylindrical member within said rotatable casing.

5. A panoramic camera comprising in combination a stationary base, a stationary sprocket drum supported by this base and adapted to carry the film during exposure, a camera casing enclosing said stationary sprocket drum and being rotatable about the axis of the same, a supply and a winding-up spool for the film arranged within said camera casing rotatably with the same, driving means mounted on said stationary base for rotating said camera casing together with both spools during picture-taking about the axis of said stationary sprocket drum, means for rotating said winding-up spool about its axis while the same is rotating with the casing about the axis of said stationary sprocket drum, a slit-shaped aperture in a wall of said casing arranged parallel to the axis of said stationary film drum, and an objective lens having a focal length equal to the radius of said stationary film drum and being secured to said casing in front of said slit-shaped aperture, said slit-shaped aperture and said objective lens operating in such a manner as to form during their rotation the required panoramic picture on that portion of the film which is stationarily supported by said stationary film drum within said rotatable casing.

6. A panoramic camera comprising in combination a stationary base, a stationary sprocket drum supported by this base and adapted to carry the film during exposure, a camera casing enclosing said stationary sprocket drum and being rotatable about the axis of the same, a supply and a winding-up spool for the film arranged within said camera casing rotatably with the same, motion transmitting means connecting said stationary sprocket drum and said winding-up spool in such a manner as to cause rotation of the latter about its axis in the same direction as the camera casing is rotating together with both spools about said stationary sprocket drum, a slit-shaped aperture in a wall of said casing arranged parallel to the axis of said stationary film drum, an objective lens having a focal length equal to the radius of said stationary film drum and being secured to said rotatable casing in front of said slit-shaped aperture, and a reflecting mirror being secured to said casing in front of said objective lens parallel to the axis of said stationary film drum and at an acute angle with the optical axis of said objective lens.

7. In combination with a panoramic camera of the type claimed in claim 6, frictional engaging means between at least two cooperating elements of said motion transmitting means.

8. A panoramic camera comprising in combination a stationary base, a stationary sprocket drum supported by this base and adapted to carry the film during exposure, a camera casing enclosing said stationary sprocket drum and being rotatable about the axis of the same, a supply and a winding-up spool for the film arranged parallel to said sprocket drum in said camera casing rotatably together with the latter driving means for rotating said camera casing together with both spools during picture-taking about the axis of said stationary sprocket drum, motion transmitting means connecting said stationary sprocket drum and said winding-up spool for rotating the latter about its axis while it simultaneously rotates together with the casing about the axis of said stationary sprocket drum, a slit-shaped aperture in a wall of said casing arranged parallel to the axis of said stationary sprocket drum, an objective lens having a focal length equal to the radius of said stationary sprocket drum and being secured to said casing in front of said aperture in such a manner that the distance of the optical center of said lens from the axis of said stationary sprocket drum is equal to the diameter of said sprocket drum, and a reflecting member secured to said casing in front of said objective lens parallel to the axis of rotation of said casing and at an angle of 45 degrees to the optical axis of said lens.

9. A panoramic camera comprising in combination a stationary base, a stationary cylindrical member supported by this base and adapted to carry the film during exposure, a camera casing enclosing said stationary cylindrical member and being rotatable about the axis of the same, a supply and a winding-up spool for the film arranged within said camera casing rotatably with the same, means for rotating said winding-up spool about its axis of rotation while the same is simultaneously rotated together with said casing about the axis of said stationary cylindrical member, and an optical picture-taking system arranged in a wall of said rotatable casing in such a manner as to form during rotation of said casing the required panoramic picture on that portion of the film which is stationarily supported by said cylindrical member within said rotatable casing.

10. A panoramic camera comprising in combination a stationary base, a stationary sprocket drum supported by this base and adapted to carry the film during exposure, a camera casing enclosing said stationary sprocket drum and being rotatable about the axis of the same, a supply and a winding-up spool for the film arranged within said camera casing rotatably with the same, motion transmitting means connecting said stationary base and said winding-up spool, rotating the latter about its axis when said camera casing is rotating, thus causing combined rotation of said winding-up spool about its individual axis and together with said casing about the axis of said stationary sprocket drum, and an optical picture-taking system arranged in a wall of said rotatable casing in such a manner as to form during rotation of said casing the required panoramic picture on that portion of the film which is stationarily supported by said cylindrical member within said rotatable casing.

11. A panoramic camera comprising in combination a stationary base, a stationary sprocket drum supported by this base and adapted to carry the film during exposure, a camera casing enclosing said stationary sprocket drum and being rotatable about the axis of the same, a supply and a winding-up spool for the film arranged within said camera casing rotatably with the same, driving means mounted on said stationary base for rotating said camera casing together with both spools during picture-taking about the axis of said stationary sprocket drum, means for rotating said winding-up spool about its axis of rotation while the same is simultaneously rotated together with said casing about the axis of said stationary sprocket drum, and an optical picture-taking system arranged in a wall of said rotatable casing in such a manner as to form during rotation of said casing the required panoramic picture on that portion of the film which is stationarily supported by said cylindrical member within said rotatable casing.

12. A panoramic camera comprising in combination a stationary base, a stationary sprocket drum supported by this base and adapted to carry the film during exposure, a camera casing enclosing said stationary sprocket drum and being rotatable about the axis of the same, a supply and a winding-up spool for the film arranged within said camera casing rotatably with the same, driving means mounted on said stationary base for rotating said camera casing together with both spools during picture-taking about the axis of said stationary sprocket drum, motion transmitting means connecting said stationary base and said winding-up spool, rotating the latter about its axis when said camera casing is rotating, thus causing combined rotation of said winding-up spool about its individual axis and together with said casing about the axis of said stationary sprocket drum, and an optical picture-taking system arranged in a wall of said rotatable casing in such a manner as to form during rotation of said casing the required panoramic picture on that portion of the film which is stationarily supported by said cylindrical member within said rotatable casing.

13. A panoramic camera comprising in combination a stationary base, a stationary cylindrical member supported by this base and adapted to carry the film during exposure, a camera casing enclosing said stationary cylindrical member and being rotatable about the axis of the same, supply means for the film arranged within said camera casing, a winding-up member for the film arranged within said camera casing rotatably with the same, means for rotating said winding-up member about its axis of rotation while the same is simultaneously rotated together with said casing about the axis of said stationary cylindrical member, and an optical picture-taking system arranged in a wall of said rotatable casing in such a manner as to form during rotation of said casing the required panoramic picture on that portion of the film which is stationarily supported by said cylindrical member within said rotatable casing.

14. In a panoramic camera, in combination, a stationary cylindrical member adapted to carry the film during exposure, supply means for said film, a winding up member for said film arranged rotatably about the axis of said stationary cylindrical member, means for rotating said winding up member about its axis of rotation while the same is simultaneously rotated about said axis of said stationary cylindrical member, and an optical picture taking system arranged in such a manner as to form during rotation of said winding up member the required panoramic picture on that portion of said film which is stationarily supported by said stationary cylindrical member.

FRANZ G. BACK.